Sept. 9, 1958  M. L. GOLDBERG  2,850,762
METHOD AND MEANS FOR DEBONING POULTRY
Filed Jan. 24, 1957
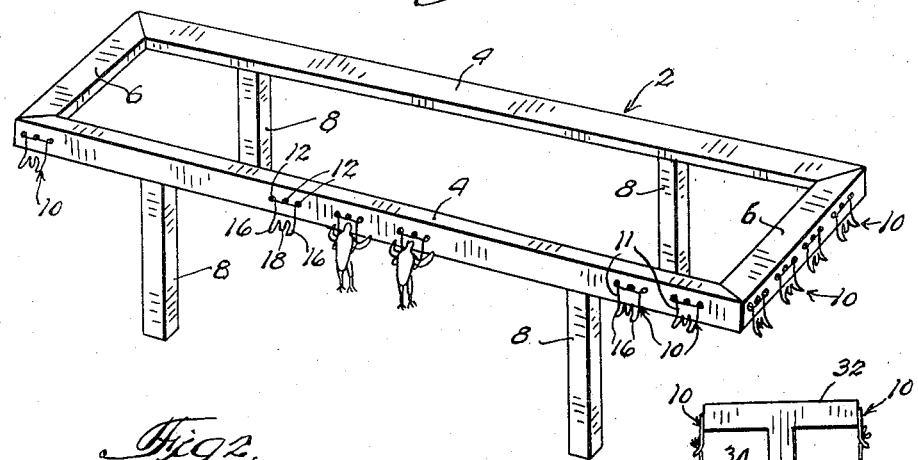
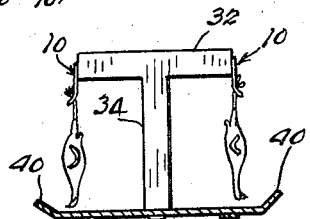
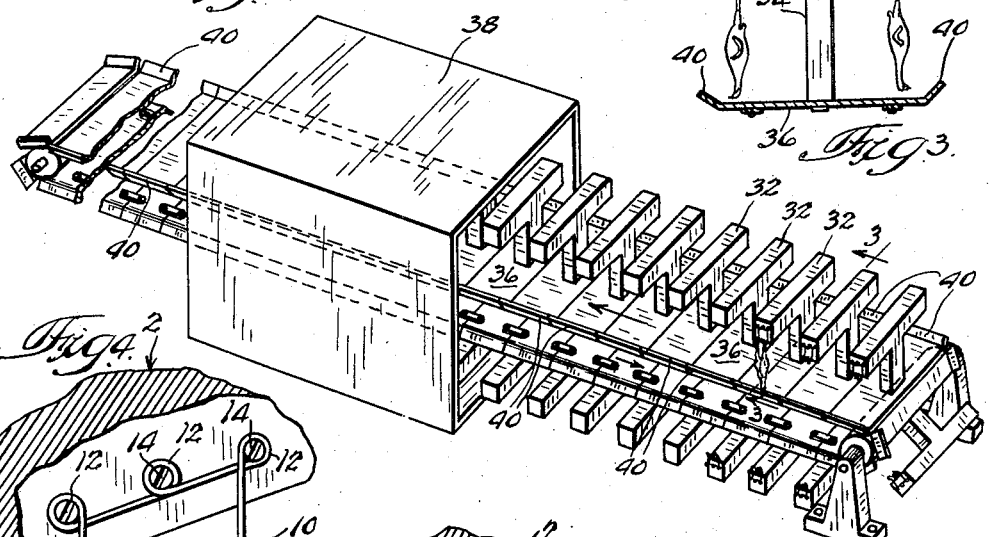
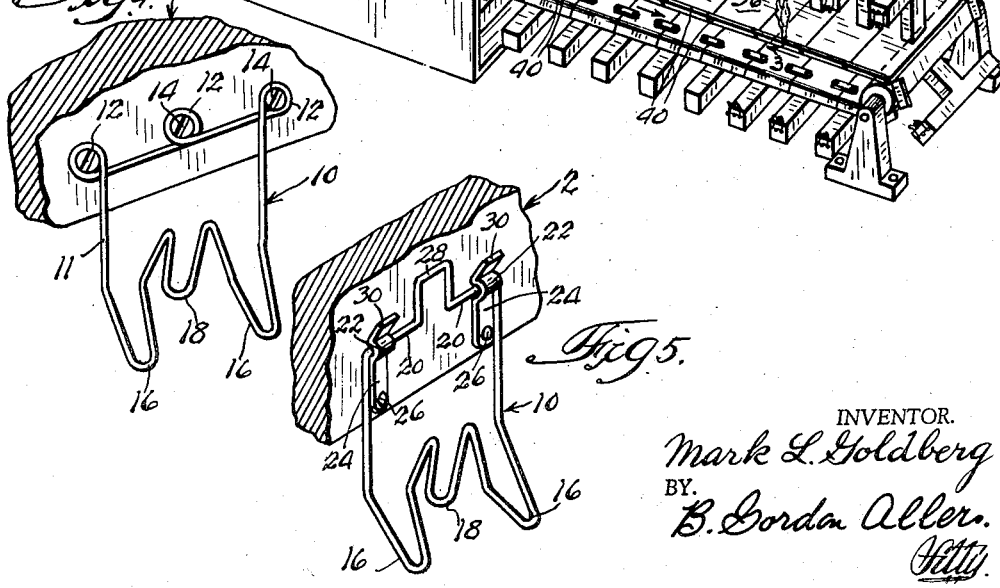
INVENTOR.
Mark L. Goldberg
BY
B. Gordon Allen

2,850,762
METHOD AND MEANS FOR DEBONING POULTRY

Mark L. Goldberg, Glencoe, Ill.

Application January 24, 1957, Serial No. 636,157

3 Claims. (Cl. 17—44.1)

This invention relates to the deboning of uncooked poultry such as chickens and, more particularly, to a novel method and means for deboning such poultry in a safe, efficient and sanitary manner heretofore unknown to the prior art.

Very little, if any, deboning of uncooked or raw fowl has been attempted by the industry although the processing of deboned chicken and other fowl put up in cans or other containers is quite common. In such cases, however, the fowl is cooked or prepared before boning and it is a relatively simple matter to detach the meat from the bones.

The advent of quick freezing and improved methods of preserving raw or uncooked meat for indefinite periods has brought about a large demand, both by the canning industry and the consumer, for raw, deboned poultry so that the same may be cooked and prepared in any desired manner and not necessarily as it has heretofore been prepared by the processor at the cannery and packing house. The deboning of raw, uncooked fowl, however, gave rise to problems which are not present in the general processing of poultry or in deboning cooked or prepared fowl where the meat is easily separated from the bones.

In the prior art methods and apparatus for handling a large volume of poultry to be killed and dressed, the fowl is held suspended by the legs, which are inserted in a shackle secured to a chain or other flexible device attached to a stationary or movable support. These prior art devices have been found to be unsafe, inefficient, unsanitary and expensive when applied to the art of deboning raw and uncooked poultry.

A shackle secured to a chain or other flexible device as used in the prior art permits the suspended fowl to sway and oscillate as the operator is cutting the meat from the bones with a knife which is necessarily very sharp and pointed. Thus the operator, in order to work efficiently, is compelled to restrain and manipulate the fowl with one hand while deboning the raw, slippery meat with the other hand, a procedure which is obviously unsafe in that it exposes the operator to excessive hazards due to the slippery nature of the meat and the accidental mishandling of the fowl or knife.

Another disadvantage of the prior art devices and techniques is the lack of efficiency and consequent expense in deboning the fowl. It is well known that in the case of uncooked poultry, the flesh clings tenaciously to the bones and when the operator, instead of having both hands free for the deboning operation, is required to use one hand to hold and manipulate the fowl, the deboning time is increased and the ability to strip the meat from the bones is decreased.

Still another disadvantage in the prior art methods and apparatus is the unsanitary conditions arising from the difficulty of cleaning the shackle and the chain and in keeping them clean. Both the shackle and the links of the chain quickly become contaminated with dried blood and other substances and because the shackle and chain are free swinging, it is difficult and often impossible to keep and maintain them in sanitary condition. The operator, in attempting to keep the suspended fowl from swinging and oscillating, is often required to touch and handle the contaminated shackle and chain and such contamination is transferred to the meat with subsequent spoilage.

In addition, the prior art devices and apparatus contain movable parts which are expensive to install and maintain and are subject to rapid deterioration.

Accordingly, a primary object of the invention is to devise novel method and means for deboning raw poultry safely, efficiently, economically and in a sanitary manner.

A more specific object of the invention is to reduce oscillation and swaying of the fowl as it is being deboned so that the operator is enabled to use both hands in the deboning operation and is exposed to minimum risk from the sharp deboning knife.

Another object of the invention is to accommodate efficient handling of the fowl to reduce the time required in deboning while effecting an increase in the amount of meat procured from the fowl.

A further object of the invention is to reduce the possibility of contaminating the meat by providing a novel shackle support which permits quick and efficient cleaning of the parts and which reduces contamination thereof in service.

Still another object of the invention is to devise a novel economical shackle suspension which uses less movable parts than in prior art arrangements and which can be more economically assembled.

The foregoing and other objects and advantages of the invention will become apparent from a consideration of the following specification and the accompanying drawings, wherein:

Figure 1 is a perspective view of an embodiment of the invention wherein the shackles are mounted on a stationary support, for manual deboning;

Figure 2 is a perspective view of a modification of the invention wherein the shackle supports are mounted on an endless conveyer for movement through a chamber containing automatic deboning equipment;

Figure 3 is a fragmentary sectional view taken in a plane indicated by line 3—3 of Figure 2;

Figure 4 is a fragmentary perspective view showing one style of shackle mounting used in either the embodiment of Figure 1 or that of Figures 2 and 3; and Figure 5 is a view similar to Figure 4 but showing a modified shackle mounting.

Describing the invention in detail and referring first to Figure 1, it will be seen that the shackle support comprises a rack generally designated 2 and including side rails 4 and end rails 6. The side rails are provided with legs 8 which support the rails at a convenient height for the average operator. A plurality of shackles 10 are mounted on the side rails 4 and end rails 6 so that the operator may move quickly around the rack, deboning and replacing deboned fowl. If desired, a conveyer (not shown) may be provided beneath the rack, as for example between the racks 8, so that the deboned meat may be dropped upon the conveyer for easy removal.

Figure 4 shows a shackle 10 composed of heavy wire of non-corrosive metal having a rigid frame 11; a pair of loops 16 to receive the legs or wings of a fowl and a central loop 18 to receive the neck of the fowl if desired. The loops 16 are preferably bent forwardly so that the supported fowl is disposed forwardly of the vertical face of the rack 2 to which the shackle is anchored. The upper portion of the shackle 10 is provided with a plurality of eyes 12 to receive the screws 14 for rigidly securing the shackle to the substantially vertical face of the rack 2.

It may be seen that the rigid attachment of the shackle 10 to the rack 2 as shown in Figure 4 positively restrains any swinging or oscillation of the shackle in any manner whatsoever and the fowl, supported by the rigidly secured shackle is held in a comparatively firm and steady position, thus the operator is permitted the use of both hands and may debone the fowl rapidly and efficiently with a minimum of manipulation. This not only reduces the risk of cutting the hands but also speeds up the process of deboning, reduces its cost and produces a larger amount of meat.

It may also be emphasized that the shackle and its support may be quickly and thoroughly cleaned, as by scrubbing with a sterilizer and then rinsing with a spray. Inasmuch as the shackle cannot move during cleaning, it is possible to efficiently and thoroughly clean the device. Furthermore, the rigid mounting of the shackle keeps the device in a clean, sanitary condition for a greater length of time than in prior art devices because the tendency of a flopping fowl to contact the shackle and its support has been eliminated by the rigid shackle mounting.

The novel shackle mounting also reduces contamination of the operator's hands by reducing the manipulation required in the deboning operation which minimizes contamination of both the shackle and the deboned meat.

It should also be noted that the novel shackle mounting shown in Figure 4 is more economical than in prior art devices for the reason that all movable parts in the mounting have been eliminated. This feature not only reduces the cost of the parts but also wear and tear on such parts and the time required to install or remove a shackle.

While the shackles are shown as being secured to a rack, the invention is not limited to such specific structure. The shackles may be rigidly secured to any fixed structure such as a board on a wall or to a table or similar fixture and the advantages of the invention may still be retained.

Referring now to Figure 5, it will be seen that a modified shackle mounting has been devised wherein the shackle 10 is of novel form and comprises spaced bearing portions 20 snapped into sockets 22 of spring clips 24 permanently mounted on the rack 2 as by nails 26. A loop 28 is provided between the bearing portions 20 said loop 28 engaging the rack 2 along a substantially vertical surface thereof, to prevent oscillation of the shackle 10. The clips 24 are preferably provided with finger-hold lugs 30 which may be engaged by the fingers of an operator or by a tool, to release the bearing portions 20 from the sockets 22 when it is desired to remove the shackle for replacement or repair.

Figure 2 shows another embodiment of the invention wherein the shackles 10 are mounted in the manner of Figures 4 or 5 on the ends of racks 32 supported by pedestals 34 anchored respectively to plates 36 hingedly interconnected to form an endless conveyer which passes through a chamber 38, the conveyer being moved by conventional and well-known means. The chamber may contain automatic deboning equipment which is not part of the present invention and accordingly is not disclosed herein. The ends of the plates 36 are preferably upturned as at 40 in the form of trays to retain the deboned meat dropped on the plates by the deboning equipment. An overhead conveyer upon which the shackles are rigidly secured may also be employed. It is to be understood that the conveyors as described herein may be used without the chamber 38 and for the purpose of facilitating manual deboning by stationed operators.

Thus, it will be understood that the invention comprehends a novel and efficient method and means for deboning uncooked fowl by rigidly mounting a shackle on a fixed support, attaching the legs or the wings of the fowl to the shackle, and then cutting the meat from the fowl. This novel apparatus and procedure not only is safer for the operator but is quicker, more economical and more sanitary than prior art practices. It is inexpensive, easy to clean and easy to maintain.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A shackle for rigidly holding a fowl during treatment comprising an upper attaching portion, including a horizontally elongated member having a plurality of securing means in operative association therewith adapted to have engagement with a rigid support, depending portions adjacent the ends of said elongated member each including a leg or wing engaging loop and a portion interconnecting said loops comprising a central neck engaging loop.

2. Apparatus for deboning fowl comprising a rigid rack having a substantially vertical surface, a plurality of rigid shackles secured by rigid joints in vertical position and in spaced relation on said surface, each of said shackles comprising an upper attaching portion including a horizontally elongated member having a plurality of securing means in operative association therewith adapted to have engagement with said vertical surface of said rack, depending portions adjacent the ends of said elongated member each including a leg or wing engaging loop and a portion interconnecting said loops comprising a central neck engaging loop, each of said shackles being adapted to retain an individual fowl in suspended position beneath said rack without substantial sway or oscillation to afford ready access for deboning, each fowl being firmly held in each shackle against the stress and pull incident to the deboning operation.

3. Apparatus for deboning fowl comprising a rigid support, a rigid shackle secured by rigid joints in vertical position on said support, said shackle comprising an upper attaching portion including a horizontally elongated member having a plurality of securing means in operative association therewith adapted to have engagement with said rigid support, depending portions adjacent the ends of said elongated member each including a leg or wing engaging loop and a portion interconnecting said loops comprising a central neck engaging loop, said shackle being adapted to retain an individual fowl in suspended position without substantial sway or oscillation to afford ready access for deboning, said fowl being firmly held in said shackle against the stress and pull incident to the deboning operation.

References Cited in the file of this patent

UNITED STATES PATENTS

| | | |
|---|---|---|
| 1,108,055 | Wolfe et al. | Aug. 18, 1914 |
| 1,660,583 | Shrauger | Feb. 28, 1928 |
| 2,210,377 | Onorato et al. | Aug. 6, 1940 |
| 2,584,377 | Wunderlich | Feb. 5, 1952 |
| 2,613,390 | Wayne | Oct. 14, 1952 |
| 2,738,547 | Zebarth | Mar. 20, 1956 |
| 2,764,778 | Long | Oct. 2, 1956 |
| 2,817,874 | Conaway | Dec. 31, 1957 |